(No Model.) 8 Sheets—Sheet 1.

F. LEMAN.
MANUFACTURE OF PINION BLANKS.

No. 380,499. Patented Apr. 3, 1888.

Fig. 1.

Witnesses:
Chas. J. Williamson
Henry C. Hazard

Inventor:
Frank Leman, by
Prindle and Russell, his Att'ys (No Model.) 8 Sheets—Sheet 2.
F. LEMAN.
MANUFACTURE OF PINION BLANKS.

No. 380,499. Patented Apr. 3, 1888.

Fig. 2

Witnesses:
Chas. J. Williamson,
Henry C. Hazard.

Inventor:
Frank Leman, by
Crindle and Russell, his Att'ys (No Model.) 8 Sheets—Sheet 3.
F. LEMAN.
MANUFACTURE OF PINION BLANKS.

No. 380,499. Patented Apr. 3, 1888.

Fig. 3.

Witnesses:
Chas. J. Williamson
Henry C. Hazard

Inventor.
Frank Leman, by
Crindle and Russell his Attys (No Model.) 8 Sheets—Sheet 5.

F. LEMAN.
MANUFACTURE OF PINION BLANKS.

No. 380,499. Patented Apr. 3, 1888.

Witnesses:
Chas. J. Williamson.
Henry C. Hazard.

Inventor:
Frank Leman, by
Dindle & Russell, his Attys.

(No Model.) 8 Sheets—Sheet 7.

F. LEMAN.
MANUFACTURE OF PINION BLANKS.

No. 380,499. Patented Apr. 3, 1888.

Witnesses
Chas. J. Williamson,
Henry C. Hazard.

Inventor
Frank Leman, by
Crundle and Russell, his Attys.

United States Patent Office.

FRANK LEMAN, OF ELGIN, ILLINOIS.

MANUFACTURE OF PINION-BLANKS.

SPECIFICATION forming part of Letters Patent No. 380,499, dated April 3, 1888.

Application filed October 16, 1886. Serial No. 216,444. (No model.)

*To all whom it may concern:*

Be it known that I, FRANK LEMAN, of Elgin, in the county of Kane, and in the State of Illinois, have invented certain new and useful Improvements in the Manufacture of Pinion-Blanks; and I do hereby declare that the following is a full, clear, and exact description thereof, reference being had to the accompanying drawings, in which—

Letters of like name and kind refer to like parts in each of the figures.

The object of my invention is to enable pinion-blanks to be quickly and cheaply produced by automatic mechanism; and to this end such invention consists in the methods and mechanisms employed, substantially as and for the purpose hereinafter specified.

Figure 1:
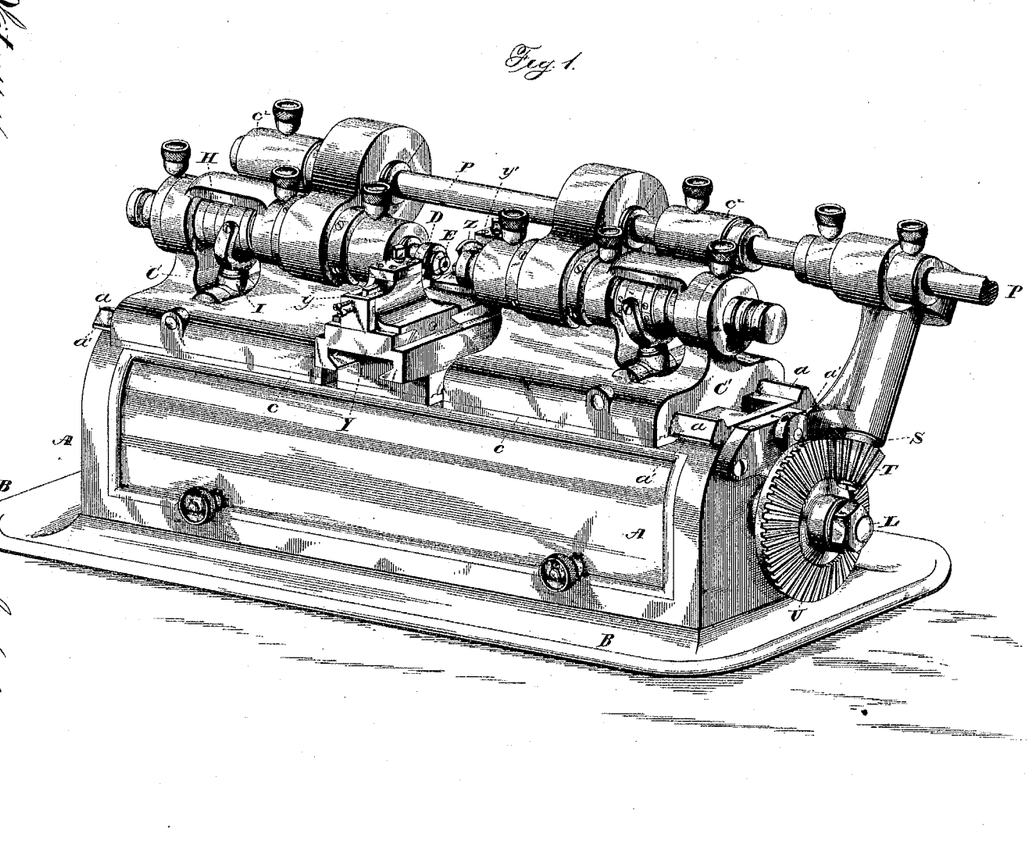
Figure 1 is a perspective view of my machine as arranged for use.
Figure 2:
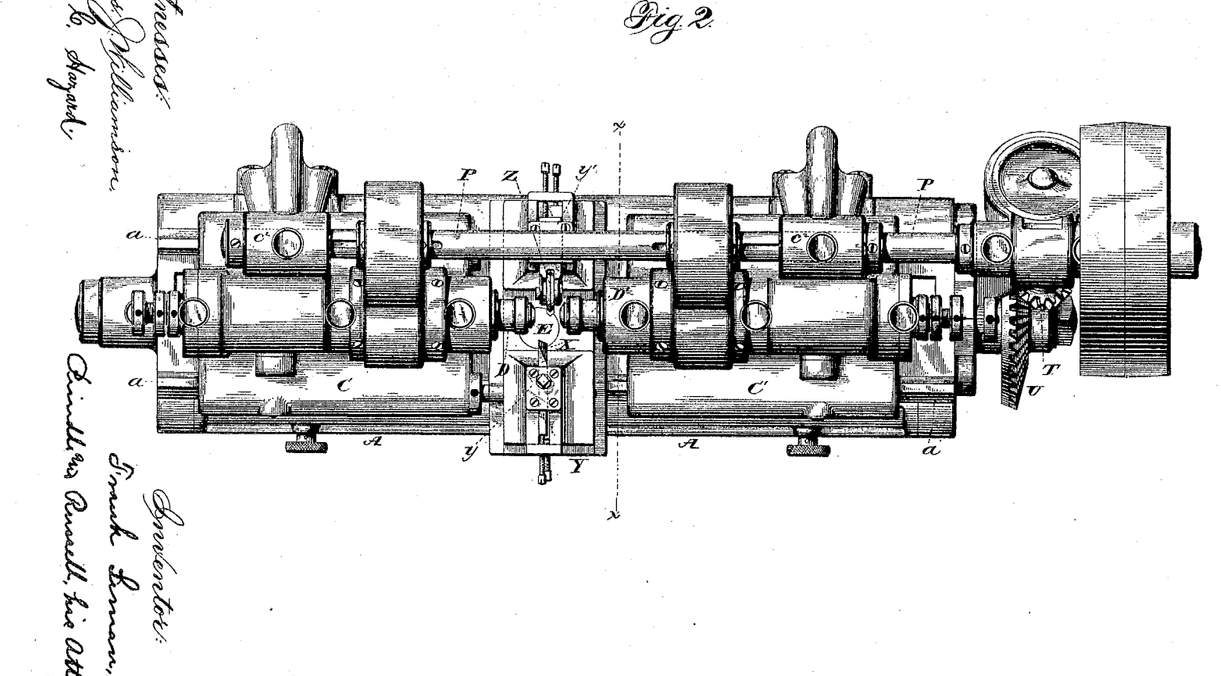
Fig. 2 is a plan view of the same.
Figure 3:
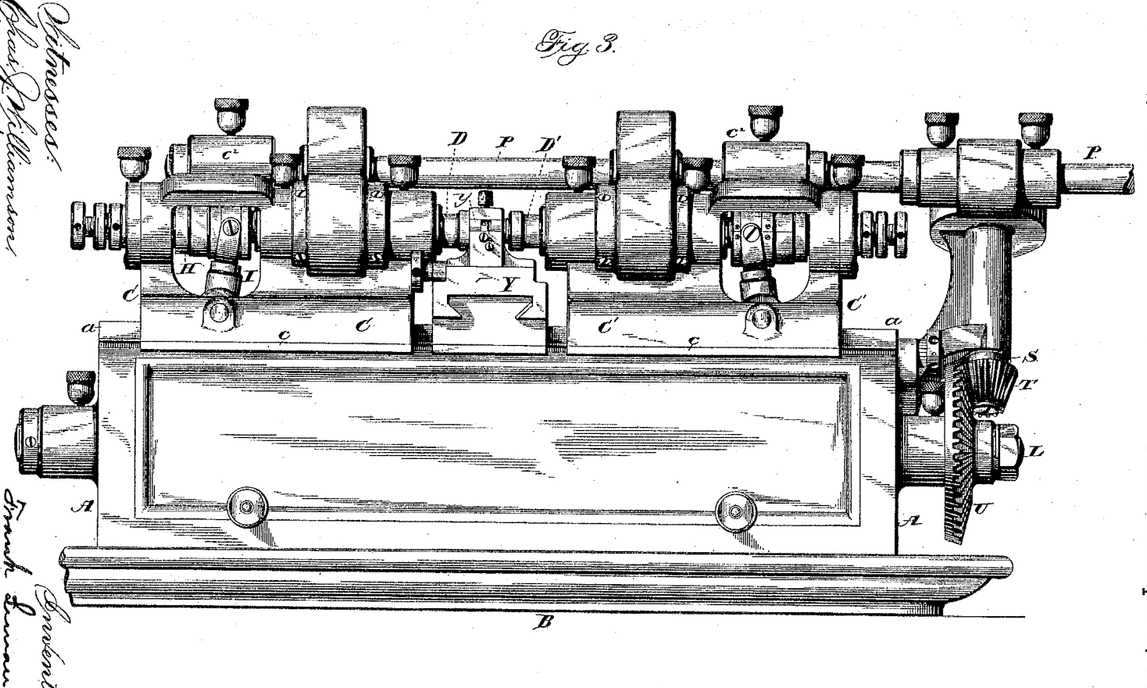
Fig. 3 is an elevation of the front side of said machine.
Figure 4:
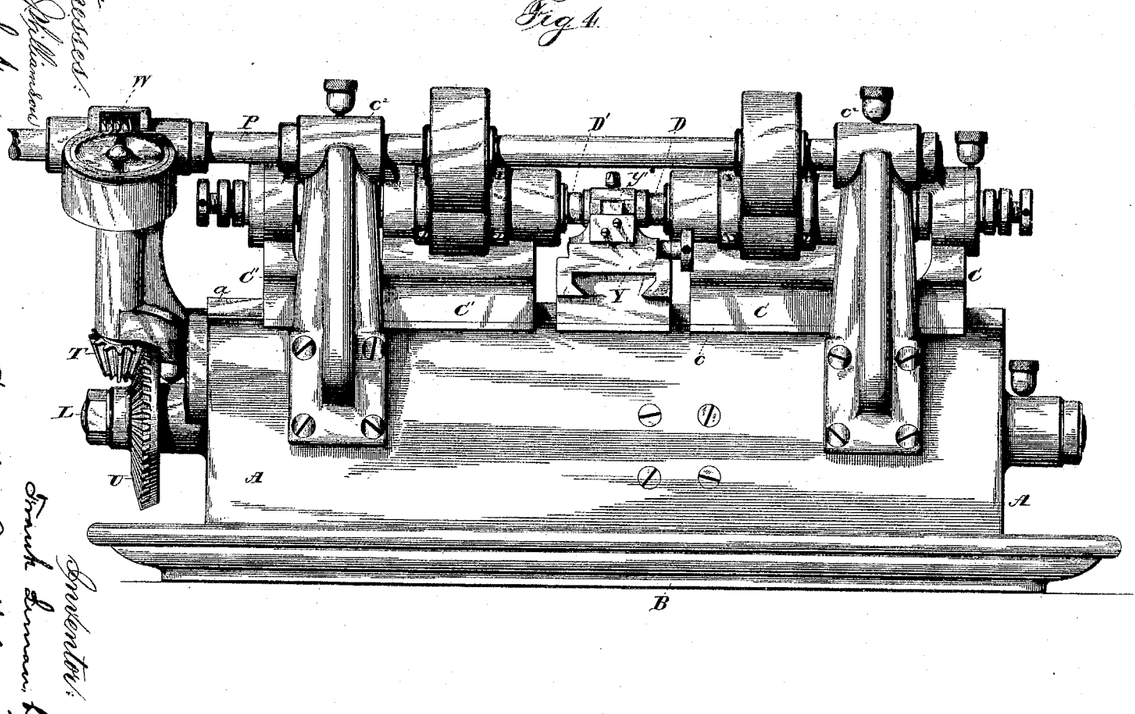
Fig. 4 is a like view of the rear side of the same.
Figure 5:
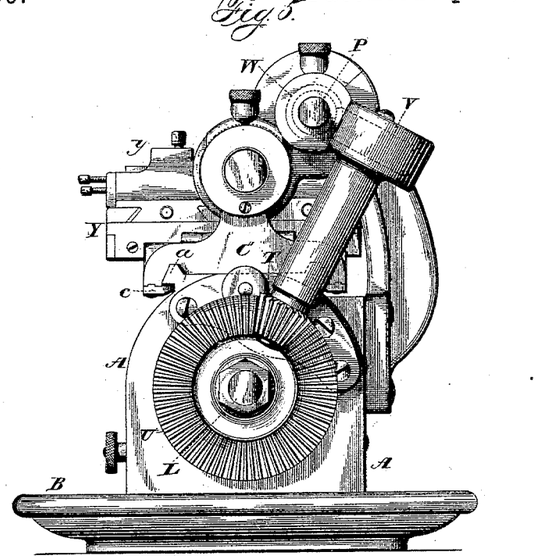
Figs. 5 and 6 are elevations of opposite ends of said machine.
Figure 6:
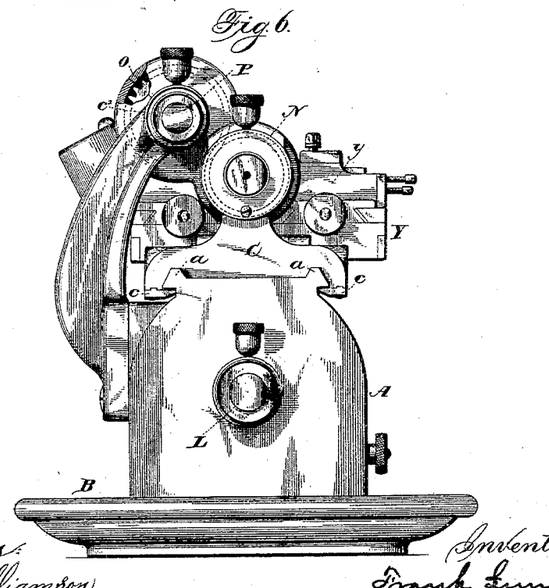
Figure 7:
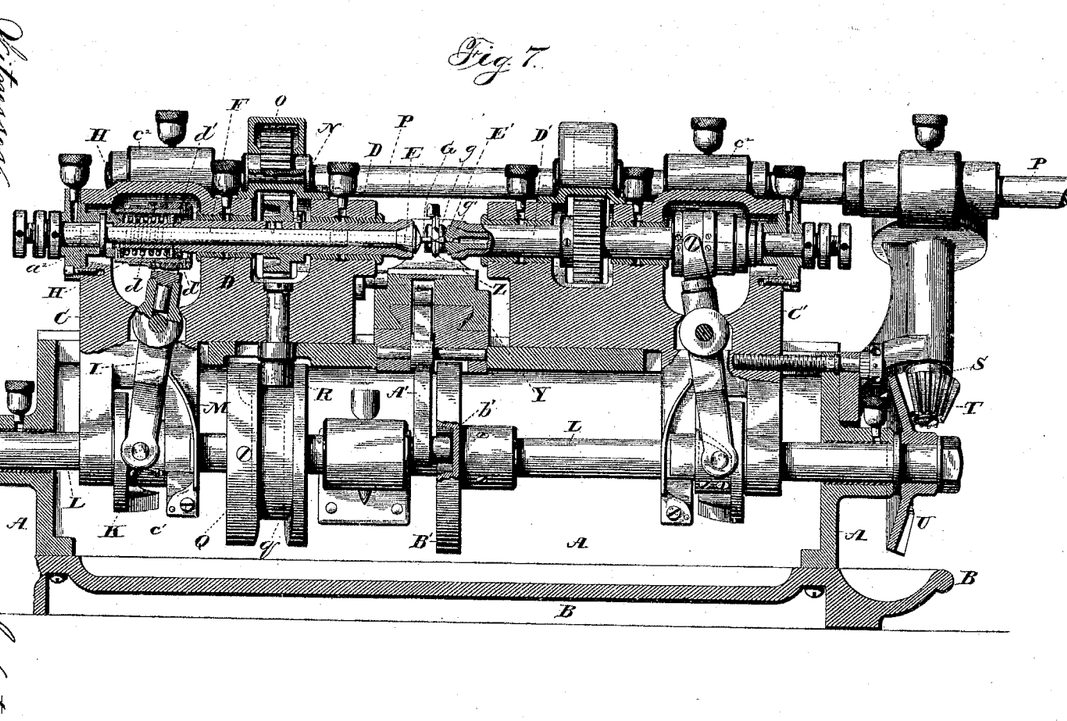
Fig. 7 is a vertical central section of the same upon its longitudinal axis.
Figure 8:
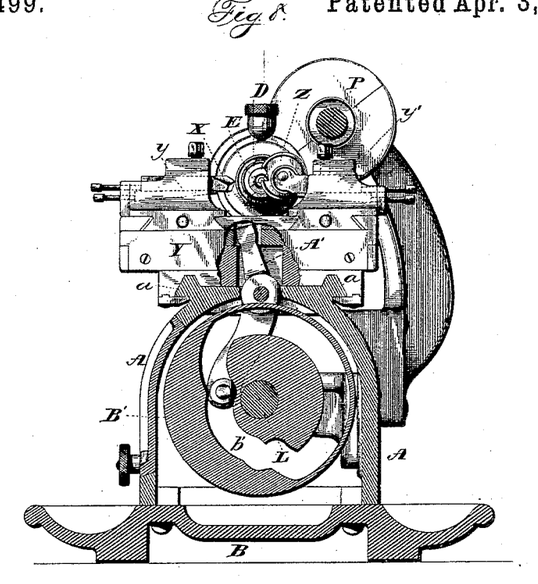
Fig. 8 is a cross-section upon line $x\ x$ of Fig. 2, and shows the pointing and cutting-off tool in operation.
Figure 9:
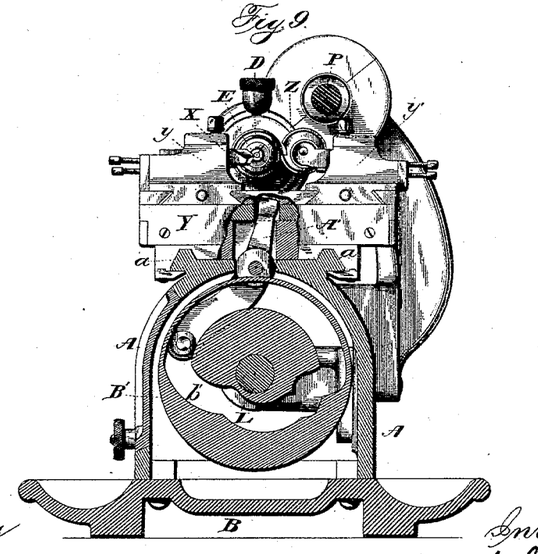
Fig. 9 is a like view of the same, and shows the turning-tool in operation.

In the construction of my machine I employ a hollow frame, A, which has the general form shown in Fig. 1, and rests upon a base, B, that preferably projects at each side and end and forms around the same a gutter to catch drippings and chips. Upon the upper side of said frame are formed two parallel $\wedge$-shaped ways, $a$ and $a$, that resemble the ways of an engine-lathe. Said ways are arranged at the side edges of said frame, and each projects therefrom sufficiently to furnish a bearing, $a'$, beneath for locking-gibs.

Fitted upon and adapted to slide lengthwise of the ways $a$ and $a$ are two heads, C and C', that have the general form shown, each of which is held in position thereon by means of two gibs, one of which, $c$, is secured to and projects from each side of said head beneath the adjacent bearing, $a'$.

Journaled within the head C is a hollow spindle, D, that is adapted to receive within its inner end a split chuck, E, of usual form, and within its body contains a draw-spindle, F, which has its front end connected with the rear end of said chuck and its rear end, which projects beyond said spindle D, journaled within a bearing, $a^2$, that operates to prevent longitudinal motion without interference with freedom of rotation. Said spindles D and F are connected together circumferentially, so as to cause the latter to revolve with the former.

Both the draw-spindle F and chuck E have an axial opening through which is passed a wire, G, from which the desired pinion-blanks are to be made. Said chuck has its split end opened and closed by a longitudinal movement of the spindle D, which movement is effected by the following means, viz: Around the rear end of the spindle D is placed a spiral spring, $d$, that longitudinally is confined between the bearing $a^2$ and a collar, $d'$, which is secured upon said spindle at a suitable distance in front of the same, by which arrangement said spring operates to hold said spindle with a yielding pressure at the front limit of its motion, so as to close the jaws of the chuck E. Fitted around the spring $d$ and collar $d'$ is a thimble, H, which interiorly has such diameter as to slide freely over the same, except at the front end of said collar, where it has such size only as to permit it to slide over the spindle D and to cause it when moved rearward to engage with said collar and to move the same and said spindle in such direction. The longitudinal rearward movement of the thimble H is effected by means of a lever, I, which is pivoted centrally within the head C, with its upper end in engagement with said thimble and its lower end in engagement with a cam, K, that is secured upon a horizontally-journaled driving-shaft, L, within the frame A. Said cam is so timed as to move said thimble and the spindle D rearward at the predetermined moment, so as to open the chuck E to hold said parts in such position for an instant and then to release them, so that the spring $d$ may return said spindle to its normal position and again close said chuck. Said lever is held with a yielding pressure in engagement with said cam by means of a spring, M, that is secured at one end upon a leg, $c'$, which projects downward from the head C, and at its opposite end bears against the front side of said lever.

The spindle D is caused to have a continuous rotary motion by means of a pinion, N, which is secured thereon at or near its longitudinal center and meshes with a gear-wheel, O, that is secured to and rotates with a driving-shaft, P, which shaft is journaled within suitable bearings, $c^2$, that are provided upon the rear sides of the heads C and C'.

The head C is moved lengthwise of the frame A within certain limits by means of a cam, Q, which is secured upon and revolves with the driving-shaft L, and is provided with a peripheral groove, $q$, that engages with a stud, R, which projects downward from said head, or with a roller that is journaled upon said stud. Said cam is so timed that said head will move slowly forward the predetermined distance, will then have a period of rest, and will then return rapidly to the rear limit of its motion.

The head C', unlike the head C, has no movement upon the frame except such as is necessary in order to adjust the machine for different lengths of pinion-blank. It is provided with a spindle, D', split chuck E', and operative mechanism for the same, which are in all respects duplicates of the spindle D, chuck E, and their operative mechanism, and therefore will not be further described.

The shafts L and P are connected together at one end of the machine by means of a short shaft, S, which extends between the same, and upon one end is provided with a bevel-pinion, T, that meshes with a bevel-gear, U, upon the adjacent end of said shaft L, while upon its opposite end said shaft S has secured a worm-wheel, V, which meshes with a worm, W, upon said shaft P.

The staff end $g'$ of each pinion $g$ is formed by an ordinary lathe-tool, X, which is held within the tool-post $y$ of a slide-rest, Y. Said slide extends transversely across the central portion of the frame A, and said tool-post $y$ is secured upon its front end, while upon its rear end is secured a second similar tool-post, $y'$, that carries a disk-cutter, Z, of usual form.

The slide-rest Y is adapted to be moved horizontally crosswise of the frame A by means of a lever, A', which is pivoted centrally within the said frame, with its upper end in engagement with the lower side at the longitudinal center of said slide and its lower end in engagement with a cam-track, $b'$, that is provided within the face of a cam, B', upon the shaft L.

In the use of the machine described a wire G, of suitable size, is placed within the chuck E, with its inner end projecting from the latter a distance sufficient to form the staff end $g'$ of a pinion, $g$, after which the machine is started. The pointing-cutter Z now moves forward and points the end of the wire G, after which it recedes and the cutter X is simultaneously moved inward into engagement with the end of said wire, and the head C then moves slowly forward until by the rotation of said wire against said cutter the surplus stock is removed and a staff, $g'$, of the predetermined diameter and length is formed. The cutter X is now withdrawn, the forward motion of the head C ceases, the chucks E and E' are opened, and the wire G is moved forward by any usual means until its reduced end $g$ has entered said chuck E', with the shoulder at the end of said part against the end of the latter, after which said latter chuck closes. Said chuck E is then closed, and the rear cutter, Z, moves forward into contact with said wire and quickly cuts within the same a V-shaped groove, which not only gives the desired point to the rear end, $g'$ of the pinion-blank and cuts said blank off from said wire, but also by the same cut points the staff end of the blank next to be made. The cutter Z and head C now move quickly to their rear positions, the chuck E' opens, and the completed blank $g$ is, by means of an ordinary pump-center, ejected from the same, after which the cutter X moves into place and the operation described is repeated.

Figure 10:
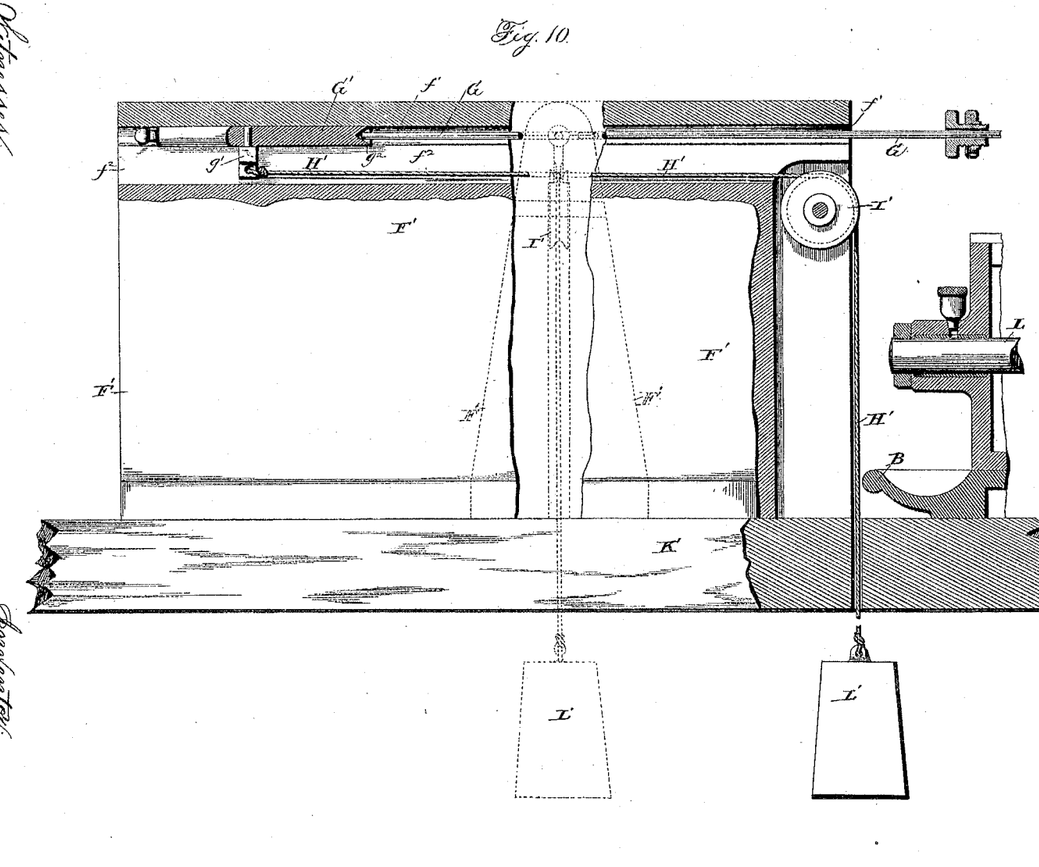
Fig. 10 is a side elevation, partly in section, of mechanism employed for feeding forward the wire stock.

The means preferably used for feeding forward the wire stock is shown in Fig. 10, and consists, essentially, of a frame F', which is provided with a round horizontal opening, $f'$, that is in a line axially with the axial openings of the chuck-spindles D and D' and contains a correspondingly-shaped rod or follower, G', that is adapted to slide freely within and lengthwise of said opening $f'$. At the lower side of the latter is provided a groove, $f^2$, which extends the entire length of the frame and receives and contains a stud, $g'$, that projects downward into the same from the follower G'. To the stud $g'$ is attached one end of a cord, H', which cord extends within the groove $f^2$ to the front end of the frame, thence over a pulley, I', that is pivoted at such point, and from thence downward through the supporting-table K', and has its lower end connected with a weight, L'.

In the use of the mechanism described the wire stock G is inserted within the front end of the opening $f'$, with its end in engagement with a conical recess, $g^2$, that is provided in the front end of the follower G', when, by moving said stock longitudinally rearward, said follower will be moved in the same direction and the weight L' correspondingly raised. As thus arranged, said wire stock is left free to rotate with the chuck-spindles; but when the clamping-chucks are opened the action of said weight causes said follower to instantly move said stock forward as far as permitted, such operations being automatically repeated each time said chucks are opened. When the wire stock has been shortened until beyond the action of the follower, a new wire stock is inserted, with its front end in engagement with the rear end of the stock being operated upon, when the operation of parts again goes forward as before.

Having thus described my invention, what I claim is—

1. As an improvement in the manufacture of pinion-blanks, the method employed, which consists in forming the staff end of a blank from and upon the projecting end of a rotating wire by means of a cutting-tool, and then by one operation of another cutter severing the blank from the wire and simultaneously pointing its rear end and the staff end of the blank next to be made, substantially as and for the purpose specified.

2. As an improvement in mechanism for manufacturing pinion-blanks, an organization in which are combined two chucks that are arranged to rotate in the same axial line with equal speed and in the same direction and are adapted, respectively, to grasp a wire stock and a partially-completed blank, means, substantially as described, for turning the staff end of a blank upon the wire stock as it projects from one chuck, means, substantially as described, for then feeding forward the wire stock until the staff end of the blank formed thereon is grasped within the other chuck, and means, substantially as described, for then cutting said blank from off the wire stock and simultaneously pointing its rear end and the staff end of the blank next to be made, substantially as and for the purpose shown.

3. As an improvement in mechanism for the manufacture of pinion-blanks, an organization in which are combined a chucking-spindle which is journaled within a movable head, a chucking-spindle that is journaled within a stationary head, means, substantially as shown, for automatically feeding the wire stock through one chuck into the other chuck, and means, substantially as shown, for simultaneously turning the staff end of one pinion-blank and completing another pinion-blank by pointing its rear end and severing it from the wire stock, substantially as and for the purpose set forth.

4. As an improvement in mechanism for the manufacture of pinion-blanks, an organization in which by cutters, substantially as described, the staff portion of a pinion-blank is formed upon the projecting end of a rotating wire stock, said stock is then moved longitudinally until the staff end is clamped within a second chuck, and the blank is then completed and severed from the stock by a cutter which points its rear end and simultaneously forms the staff end of another blank, substantially as and for the purpose shown and described.

5. As an improvement in mechanism for the manufacture of pinion-blanks, the combination of two rotatable spindles which are journaled in the same axial line, are adapted to rotate continuously and with uniform velocity in one direction, and are each provided with a split chuck, mechanism, substantially as described, by which the chucks are opened and closed at predetermined times, and mechanism, substantially as described, by which, when the said chucks are thus opened, a pinion-blank wire contained in one chuck is fed forward into the other chuck, substantially as and for the purpose shown.

6. As an improvement in mechanism for the manufacture of pinion-blanks, two rotatable chuck-spindles which are journaled in the same axial line and revolve in one direction with uniform velocity and are adapted to simultaneously grasp a pinion-blank wire, in combination with cutting or reducing tools, substantially as described, that by alternate action are adapted to give shape to and cut a pinion-blank from said wire, substantially as and for the purpose shown.

7. As an improvement in mechanism for the manufacture of pinion-blanks, the combination of two rotatable spindles which are journaled in the same axial line, are adapted to rotate continuously and with uniform velocity in one direction, split chucks that are secured in and revolve with said spindles, mechanism, substantially as shown, by which the chucks are opened and closed at predetermined times, mechanism, substantially as shown, by which, when thus opened, a pinion-blank wire contained within one of said chucks is fed forward into the other chuck, and mechanism, substantially as shown, whereby, when the wire blank is clamped within and rotates with said chucks, it receives the alternate action of cutting and reducing tools, substantially as and for the purpose shown and described.

8. As an improvement in mechanism for the manufacture of pinion-blanks, two rotatable chuck-spindles which are adapted to simultaneously grasp and rotate a pinion-blank wire, in combination with cutting and reducing tools that by alternate action are adapted to partially form a pinion-blank upon said wire, and then to complete and sever such blank therefrom and simultaneously form the staff end of another blank, substantially as and for the purpose specified.

9. As an improvement in mechanism for the manufacture of pinion-blanks, the combination of two rotatable chuck-spindles which are adapted to simultaneously grasp a pinion-blank wire, a reducing-tool and a cutting-off tool, and mechanism, substantially as described, for giving to said tools alternate inward and outward movements, substantially as and for the purpose shown.

10. As an improvement in mechanism for the manufacture of pinion-blanks, the combination of two rotatable chuck-spindles which are adapted to simultaneously grasp and revolve a pinion-blank wire, mechanism, substantially as shown, by which the chucks are opened, the wire fed forward, and said chucks then closed, cutting and reducing tools that by alternate action are adapted to form and cut a pinion-blank from the blank-wire, and mechanism, substantially as shown, whereby a pinion-blank when completed is ejected from the second chuck, substantially as and for the purpose set forth.

In testimony that I claim the foregoing I have hereunto set my hand this 14th day of May, 1886.

FRANK LEMAN.

Witnesses:
  GEO. S. PRINDLE,
  CARLOS H. SMITH.